United States Patent [19]

Lundgren

[11] 4,392,133

[45] Jul. 5, 1983

[54] ELECTRONIC LOCK WITH CHANGEABLE OPENING CODE

[76] Inventor: Sten T. Lundgren, Bruksvägen 6, S-230 47 Åkarp, Sweden

[21] Appl. No.: 233,607

[22] PCT Filed: Jun. 4, 1980

[86] PCT No.: PCT/SE80/00159

§ 371 Date: Feb. 5, 1981

§ 102(e) Date: Feb. 4, 1981

[87] PCT Pub. No.: WO80/02711

PCT Pub. Date: Dec. 11, 1980

[30] Foreign Application Priority Data

Jun. 5, 1979 [SE] Sweden ............................... 7904904

[51] Int. Cl.$^3$ ........................ H04Q 9/00; E05B 41/00

[52] U.S. Cl. ............................ 340/825.31; 340/825.56

[58] Field of Search ........................ 340/825.31, 825.56

[56] References Cited

U.S. PATENT DOCUMENTS 3,906,447 9/1975 Crafton .......................... 340/825.31

FOREIGN PATENT DOCUMENTS 1003965 1/1977 Canada .......................... 340/825.31

*Primary Examiner*—Donald J. Yusko

*Attorney, Agent, or Firm*—Ostrolenk, Faber, Gerb & Soffen

[57] ABSTRACT

An electronic lock of the type which can receive a plurality of electronic keys is disclosed. Each of the electronic keys has a unique key code associated therewith, one of the keys being a control key, the remaining keys being opening keys. The lock includes a read only memory for storing a control code corresponding to the key code associated with the control key and an erasable memory for storing a set of opening codes. The lock further including a control circuit which compares the key code of each key placed in the lock to both the control code and the opening codes. The control circuit opens the lock when the key code of a key placed in the lock corresponds to any one of the opening codes and changes the set of opening codes stored in the erasable memory when the control key and one of the opening keys are sequentially placed in the lock.

16 Claims, 1 Drawing Figure

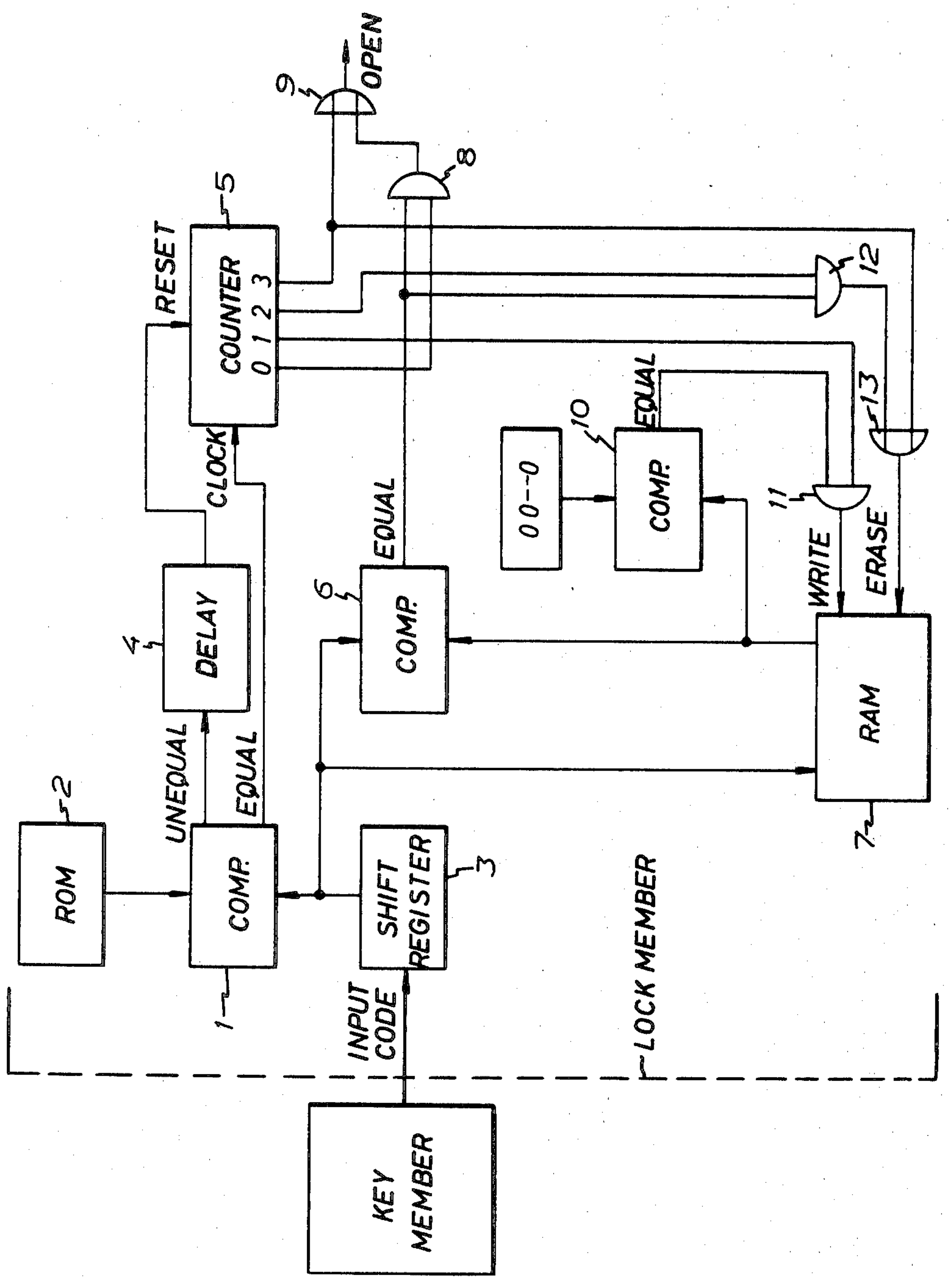
OPEN
9
8
5
RESET
COUNTER
0 1 2 3
CLOCK
12
13
EQUAL
10
0 0–0
COMP.
11
WRITE
ERASE
4
DELAY
UNEQUAL
EQUAL
6
COMP.
EQUAL
RAM
7
2
ROM
COMP.
1
SHIFT REGISTER
3
INPUT CODE
LOCK MEMBER
KEY MEMBER

ELECTRONIC LOCK WITH CHANGEABLE OPENING CODE

BACKGROUND OF THE INVENTION

This invention relates generally to an electronic lock comprising at least one key member with a code identifying said member, and a lock member having means for storing opening codes authorizing the opening of the lock, and for comparison of a code received from a key member with each of the stored opening codes.

To open an electronic lock comprising a key member and a lock member it is necessary to transmit from the key member to the lock member information that identifies the key member. This information is hereinafter designated the key code. If the code transmitted from a key member is found, when checked, to be correct, the lock is opened.

When a key is lost it shall preferably be possible to replace it with a new key having key code other than the lost one. At the same time the code of the lost key must no longer be accepted by the lock member.

It has already been suggested to use in electronic locks keys having two codes which are elements of a consecutive series such that the second code of a key is the first code of the next key, etc. If at least one code of a lost key is known, a new key can be made. See for example U.S. Patent Re. 29,259.

BRIEF DESCRIPTION OF THE INVENTION

The object of the present invention is to provide an electronic lock which in addition to the above-mentioned ability also makes it possible to select any new code which will open the lock.

This and further objects of the invention are realized in that the electronic lock of the present invention is of the type which can receive a plurality of electronic keys, each electronic key having a unique key code associated therewith, one of the keys being a control key, the remaining keys being opening keys, the lock comprising:

(A) a read only memory for storing a control code corresponding to the key code associated with the control key;

(B) an erasable memory for storing a set of opening codes;

(C) a control circuit which compares the key code of each key placed in the lock to both the control code and the opening codes, said control circuit:

(1) opening the lock when the key code of a key placed in the lock corresponds to any one of the opening codes; and (2) changing the set of opening codes stored in the erasable memory when the control key and one of the opening keys are sequentially placed in the lock.

BRIEF DESCRIPTION OF THE DRAWING

The accompanying drawing illustrates a block diagram of an embodiment of the lock member of the electronic lock according to the present invention.

DETAILED DESCRIPTION OF THE INVENTION

Referring now to the drawing, a first comparator 1 compares the contents of a programmable read only memory 2 with the output of a shift register 3 and two outputs coupled directly and via a delay element 4, respectively, to a clock input and a reset input of a counter 5 having four outputs. The output of the shift register 3 is also connected to a first input of a second comparator 6, the second input of which is coupled to the read output of a random access memory 7, the read input of which is also connected to the output of the shift register 3. The output of the comparator 6 and the first output (0) of the counter 5 are each connected to one input of an AND gate 8, the output of which is coupled to an input of an OR gate 9. The second input of OR gate 9 is coupled to the fourth output (3) of the counter 5. The read output of the random access memory 7 is also coupled to an input of a third comparator 10, the second input of which is supplied with a code containing all zeros and the output of which is coupled to an input of a second AND gate 11. The second input of the AND gate 11 is coupled to the second output (1) of the counter 5 and the output of the AND gate is connected to the write input of the random access memory 7. The output of the comparator 6 and the third output (2) of the counter 5 are connected each to one input of a third AND gate 12, the output of which is connected to an input of a second OR gate 13, the second input of which is connected to the fourth output (3) of the counter 5 and the output of which is connected to the erase input of the random access memory 7.

The above-described lock member has the following modes of function, it being presumed that a control code is stored in the read only memory 2, several opening codes, different from the control code, are stored in the random access memory 7 and the counter 5 in the reset state delivers a signal on its first output.

A key code identifying the key member is first transmitted to the shift register 3. If the key code is not equal to the control code of the read only memory 2, but is equal to an opening code of the random access memory 7, the comparator 1 will supply a signal to the delay element 4 and the comparator 6 will deliver a signal to the AND gate 8 which thus receives signals on both of its inputs and thereby delivers a signal to the OR gate 9. This signal appears at the output of the OR gate 9 as a signal releasing or allowing opening of the lock. After the delay of the delay element, a signal is supplied to the reset input of the counter 5, which is however already reset.

If the supplied key code is neither equal to the control code in the read only memory 2 nor any of the opening codes in the random access memory 7 only the delay element 4 will receive an input signal and will deliver, with delay, a reset signal to the counter 5.

If the key component is of the type containing a code corresponding to the control code in the read only memory 2, the code when supplied a first time to the shift register 3 will cause the comparator 1 to deliver a clock signal to the counter 5 and advance the counter by one step such that the signal occurs at the second output (1) of the counter 5. If the code corresponding to the control code is supplied a second time to the shift register 3, the counter 5 will be correspondingly advanced by another step and as a result a signal occurs at the third output (2) of the counter 5. If the same code is supplied a third time, the counter 5 will be advanced by a further step such that there occurs at its fourth output (3) a signal which enables the OR gate 9 and provides a signal permitting or releasing opening of the lock. The signal at the fourth output of the counter 5 is also supplied via the OR gate 13 to the erase input of the random access memory 7 whereby all opening codes stored in the random access memory are erased.

If an optional code is supplied to the shift register from a key member after the counter 5 has been advanced by one step, the code will be written into the random access memory 7 in an empty position therein, as determined by the comparator 10. Immediately afterwards the counter 5 is reset via the delay element 4, and an opening signal appears at the output of the OR gate 9.

If a code corresponding to an opening code of the random access memory 7 is supplied to the shift register 3 after the counter 5 has been advanced by two steps, only the opening code will be erased in the random access memory because of the occurrence of simultaneous signals at the inputs of the AND gate 12.

An electronic lock designed in conformity with the present invention will thus make it possible to completely control which key or keys are able to open the lock (because the codes of the key or keys are registered in the read only memory 2). The particular key having the control code is not normally utilized but is kept in a safe place. Essential advantages inherent in the lock according to the invention are that no knowledge of the codes of the keys in question is required, i.e. for use with the lock there are not required keys having codes especially developed for the the lock, and that an optional number of different keys can be registered in the random access memory and therefore be utilized for opening of the lock.

I claim:

1. An electronic lock of the type which can receive a plurality of electronic keys, each of said electronic keys having a unique key code associated therewith, one of said keys being a control key, the remaining said keys being opening keys, said lock comprising:
- (A) a read only memory for storing a control code corresponding to said key code associated with said control key;
- (B) an erasable memory for storing a set of opening codes; and
- (C) a control circuit which compares the key code of each key placed in said lock to both said control code and said opening codes, said control circuit:
  - (1) opening said lock when said key code of a key placed in said lock corresponds to any one of said opening codes; and
  - (2) changing said set of opening codes stored in said erasable memory when said control key and one of said opening keys are sequentially placed in said lock.

2. A lock as claimed in claim 1, wherein said control circuit also opens said lock when said control key is successively placed in said lock a predetermined plurality of times.

3. A lock as claimed in claim 1, wherein the manner in which said control circuit changes said set of opening codes stored in said erasable memory is determined by the number of times said control key is sequentially placed in said lock before one of said opening keys is placed in said lock.

4. A lock as claimed in claim 3, wherein said control circuit:
- (A) responds to the sequential placement of said control key in said lock a first predetermined number of times followed by the placement of one of said opening keys in said lock by erasing that opening code stored in said erasable memory which corresponds to said one of said opening keys; and
- (B) responds to the sequential placement of said control key in said lock a second predetermined number of times followed by the placement of another one of said opening keys in said lock by adding the opening code corresponding to said another of said opening keys to said set of opening codes stored in said erasable memory.

5. A lock as claimed in claim 4, wherein said control circuit erases all of said opening codes stored in said erasable memory in response to the sequential placement of said control key in said lock a third predetermined number of times.

6. A lock as claimed in any one of claims 1 or 2, wherein said control circuit erases all of said opening codes stored in said erasable memory in response to the sequential placement of said control key into said lock a predetermined number of times.

7. A lock as claimed in claim 1, wherein said erasable memory is a random access memory.

8. A lock as claimed in claim 1, wherein said control circuit includes a first comparison circuit for comparing the key code of each key placed in said lock to said control code and a second comparison circuit for comparing the key code of each key placed in said lock to said opening codes.

9. An electronic lock, comprising:
- (A) a plurality of electronic keys, each of said electronic keys having a unique key code associated therewith, one of said keys being a control key, the remaining said keys being opening keys; and
- (B) a lock member including:
  - (1) a read only memory for storing a control code corresponding to said key code associated with said control key;
  - (2) an erasable memory for storing a set of opening codes; and
  - (3) a control circuit which compares the key code of each key placed in said lock to both said control code and said opening codes, said control circuit:
    - (a) opening said lock when said key code of a key placed in said lock corresponds to any one of said opening codes; and
    - (b) changing said set of opening codes stored in said erasable memory when said control key and one of said opening keys are sequentially placed in said lock.

10. A lock as claimed in claim 9, wherein the manner in which said control circuit changes said set of opening codes stored in said erasable memory is determined by the number of times said control key is sequentially placed in said lock before one of said opening keys is placed in said lock.

11. A lock as claimed in claim 10, wherein said control circuit:
- (A) responds to the sequential placement of said control key in said lock a first predetermined number of times followed by the placement of one of said opening keys in said lock by erasing that opening code stored in said erasable memory which corresponds to said one of said opening keys; and
- (B) responds to the sequential placement of said control key in said lock a second predetermined number of times followed by the placement of another one of said opening keys in said lock by adding the opening code corresponding to said another of said opening keys to said set of opening codes stored in said erasable memory.

12. A lock as claimed in claim 11, wherein said control circuit erases all of said opening codes stored in said erasable memory in response to the sequential placement of said control key in said lock a third predetermined number of times.

13. A lock as claimed in claim 12, wherein said control circuit opens said lock in response to the sequential placement of said control key in said lock a fourth predetermined number of times.

14. A lock as claimed in any one of claims 9 or 10, wherein said control circuit erases all of said opening codes stored in said erasable memory in response to the sequential placement of said control key into said lock a predetermined number of times.

15. A lock as claimed in claim 9, wherein said erasable memory is a random access memory.

16. A lock as claimed in claim 9, wherein said control circuit includes a first comparison circuit for comparing the key code of each key placed in said lock to said control code and a second comparison circuit for comparing the key code of each key placed in said lock to said opening codes.

* * * * *